April 17, 1962   J. R. METZGER   3,029,677
MATERIAL CUTTERS FOR MULTIPLE TOOL PRESSES
Filed May 28, 1958                    2 Sheets-Sheet 1

INVENTOR
J. R. METZGER
By W. A. Johnson
ATTORNEY

April 17, 1962  J. R. METZGER  3,029,677
MATERIAL CUTTERS FOR MULTIPLE TOOL PRESSES
Filed May 28, 1958  2 Sheets-Sheet 2

INVENTOR
J. R. METZGER
By W. Johnson
ATTORNEY

United States Patent Office 3,029,677
Patented Apr. 17, 1962

3,029,677
MATERIAL CUTTERS FOR MULTIPLE
TOOL PRESSES
John R. Metzger, Colonia, N.J., assignor to Western Electric Company, Incorporated, New York, N.Y., a corporation of New York
Filed May 28, 1958, Ser. No. 738,461
7 Claims. (Cl. 83—620)

This invention relates to material cutters for presses, particularly multiple tool presses.

Multiple tool presses have upper and lower holders adapted to support varied arrangements of tools, such as perforators, punches, dies and other forming tools to process, for example, strips of material into various types of articles. In such presses, it is important that the tools mounted in the lower holder have their upper surfaces disposed in a given plane to support the strip of material jointly as it is positioned in the press and prevent distortion of the material which would result if the upper surfaces of the lower tools were in different planes during the operating cycle of the press. The processing tools become dull after repeated use and they are usually sharpened by grinding operations which result in locating the upper surfaces of the lower tools in new planes. A cutter on such a machine employed to cut predetermined lengths from the material may require more or less sharpening than the other tools and must be capable of being adjusted to the new plane.

The object of the present invention is a more efficient material cutter which is adjustable in height for use with material processing tools.

In accordance with the object, the invention comprises a material cutter for a multiple press having upper and lower holders, for the mounting of sets of material processing tools thereon, adapted for relative movement during operating cycles of the press to cause the sets of tools to process a strip of material, the tools mounted on the lower holder having their upper surfaces lying in a given plane to support the material jointly, the material cutter comprising a support having an upper surface on which a cutter is mounted, the cutter having an upper face and a cutting edge adapted to cooperate with a cutting member mounted on the upper holder to cut predetermined lengths from the material, an arm for the support mounted at any selected position on the lower holder, and an element mounted on the support and movable relative to the arm to support the face of the cutter in the plane.

More specifically, the cutter has a plurality of cutting edges positioned around the upper face thereof. A pair of pins extending upwardly from the support are adapted to enter any two of a plurality of apertures in the cutter to locate any cutting edge selectively in the cutting position. Also the support has a spindle rotatably mounted therein with like cams keyed to the ends of the spindle for rocking motion to cause like portions of the cams simultaneously to engage the arm and vary the vertical position of the support to locate the face of the cutter in any desired plane.

Other objects and advantages will be apparent from the following detailed description when considered in conjunction with the accompanying drawings, wherein:

FIG. 5 is an enlarged fragmentary sectional view of the material cutter.

Figure 1:
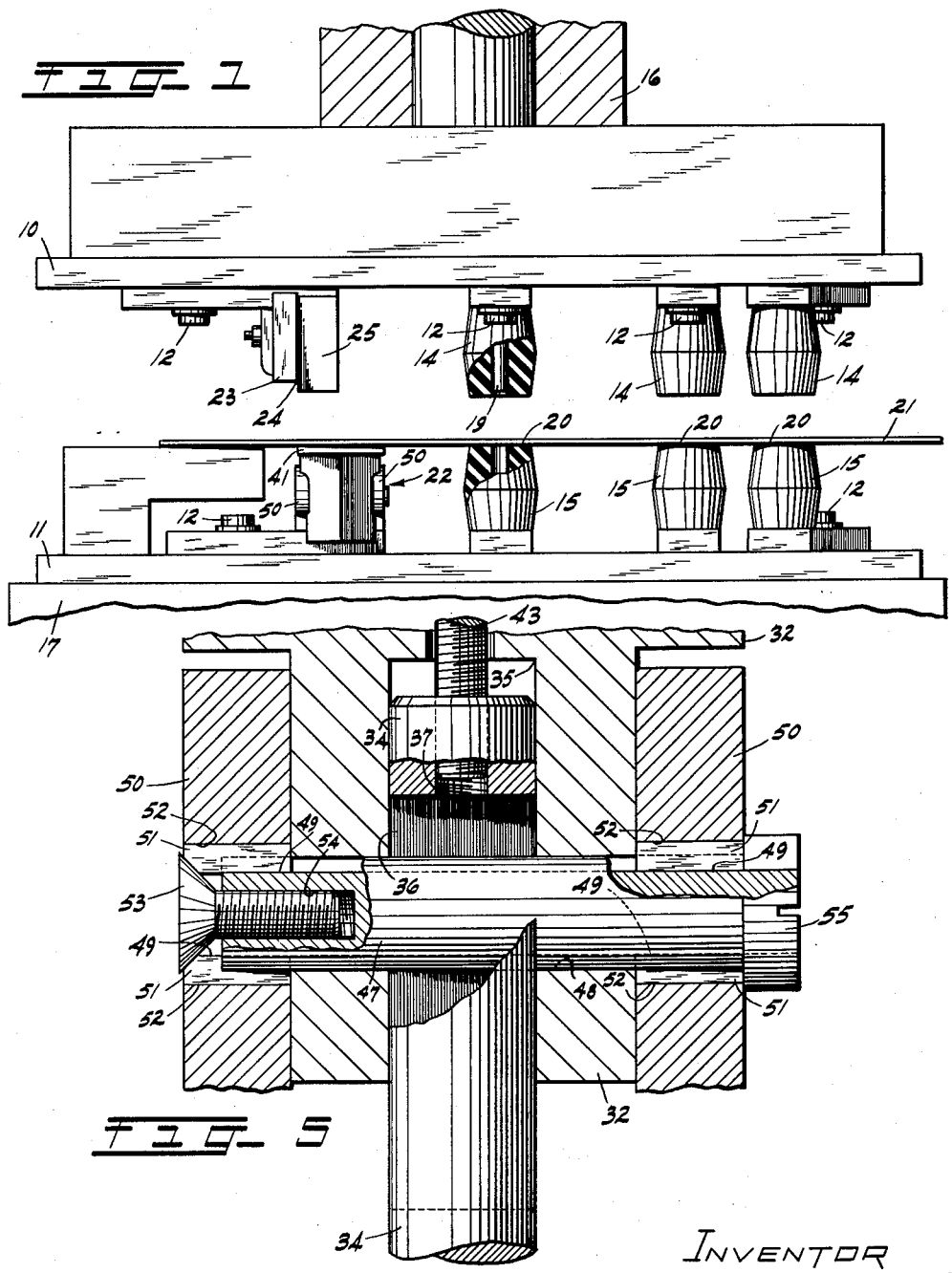
FIG. 1 is a front elevational view of a press embodying the invention.
Figure 2:
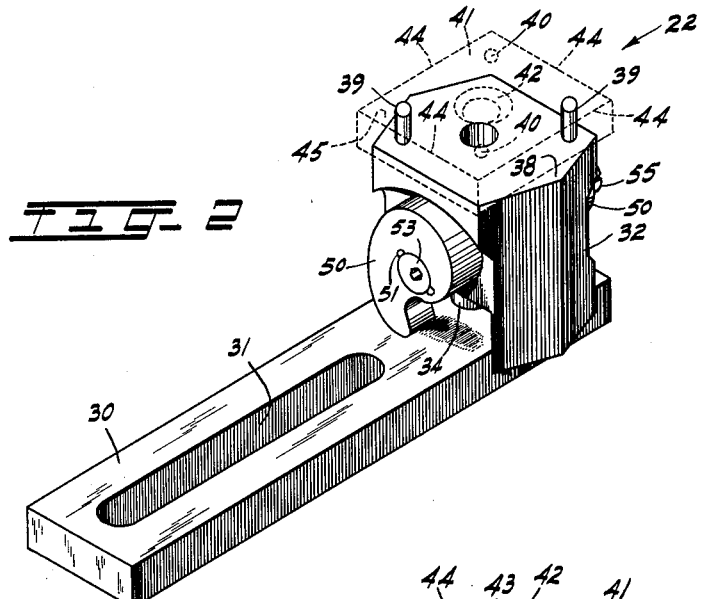
FIG. 2 is an isometric view of the material cutter.
Figure 3:
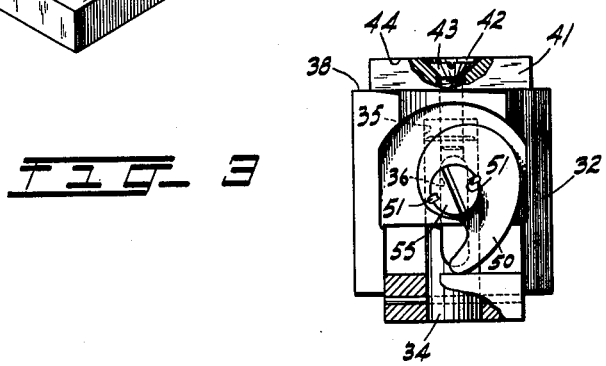
FIG. 3 is an end elevational view of the material cutter.
Figure 4:
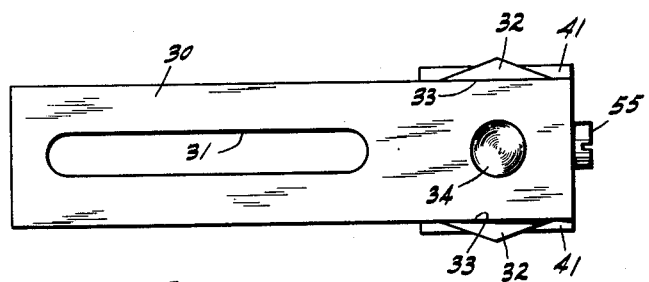
FIG. 4 is a bottom plane view of the material cutter.

In the present instance the press (FIG. 1), selected to illustrate the invention, includes an upper holder 10 and a lower holder 11 provided with the conventional multiplicity of threaded apertures (not shown) for machine screws 12 used in mounting any desired number of tools 14 and 15 respectively thereon. The holders 10 and 11 are adapted to move through their operating cycles by relative motion imparted thereto for moving either both of the holders simultaneously toward and away from each other, or allowing one of the holders to remain against movement while the other is moved through the necessary operating cycle. In the present instance, the upper holder 10 is supported by a ram 16 to move the upper holder predetermined distances toward and away from the lower holder 11. The lower holder is mounted upon a bed 17. The conventional processing tools 14 and 15 require sharpening occasionally, this being accomplished through grinding operations wherein like thicknesses of materials are removed either simultaneously or individually from the working portions of the tools such as the lower end 19 of an upper tool 14, which may be a perforator, and the upper surfaces 20 of the lower tool 15 which may be dies. Usually, as in the present instance, the upper surfaces 20 of the conventional processing tools 15 are purposely disposed initially and after grinding operations in like planes to jointly support a strip of material 21 which is to be processed thereby, and to prevent distortion of the material, which would occur if the surfaces 20 would be in different planes.

The material cutter, indicated generally at 22, is to cooperate with a suitable movable cutter 23, mounted on the upper holder 10 and having a cutting edge 24 to cut lengths from the strip of material 21. A pressure pad 25, supported for vertical movement parallel with the cutter 23, is urged by a spring to engage the material 21 in advance of the movable cutter 23.

The material cutter 22, includes an arm 30 having an elongate aperture 31 therein for mounting at a selected position on the lower holder 11 through the aid of a machine screw 12. A support 32 has its lower end bifurcated to straddle one end of the arm 30, the leg portions of the support having surfaces 33 which slide upon parallel side surfaces of the arm to hold the support against rotary movement. A rod 34 fixedly mounted as shown in an aperture of the arm 30 extends upwardly into an aperture 35 of the support to hold the support against lateral movement and permitting vertical adjustment relative to the arm. A longitudinally extending elongate aperture 36 is formed in the rod 34 short of the upper end thereof where a threaded aperture 37 is centrally disposed. An upper surface 38 of the support 32 has two pins 39 fixedly mounted at spaced positions therein to receive any desired pair of apertures 40 of a cutter 41. The cutter 41 has a conical aperture 42 centrally disposed therein to receive a conical head of a screw 43 removably disposed in the threaded aperture 37 of the rod 34 to firmly secure the cutter 41 in any of the desired positions and to also secure the support 32 in any adjusted position. In the present instance the cutter 41 is square in general contour so that four cutting edges 44 will be positioned about the upper face 45 of the cutter.

A spindle 47 is rotatably mounted in an aperture 48 in the support 32 and has longitudinally extending pairs of diametrically opposed key-ways 49 extending the full length thereof. Identical cam-like elements 50, of the contours shown, are mounted on opposing ends of the spindle 47 and provided with pairs of keys 51. The keys 51 are mounted in grooves 52 of the elements 50 and disposed in the key-ways 49 to assure like positioning of both elements 50 when movement is imparted to the spindle through force applied to either element. A screw 53 disposed in a threaded aperture 54 in one end of the spindle has a conical head sufficiently large to engage tapered outer ends of the adjacent keys 51 and a tapered portion of the aperture for the spindle in the adjacent element 50, to force it into close engagement with the adjacent wall of the support. An enlarged head portion 55 of the other end of the spindle engages the outer surface of its adjacent element 50 and the outer ends of its keys 51 to force that element into close engagement with the adjacent wall of the support.

*Operation*

When the material cutter 22 is mounted initially in the press, the elements 50 are adjusted relative to the arm 30 to raise or lower the support 32 to position the face 45 of the cutter 41 in the original plane of the surfaces 20 of the tools 15. After continued use of the tools and cutters as shown, the tools may become dull, and require sharpening through the conventional grinding operations. It is necessary that they be removed from the press to perform these operations. However, the material cutter 22 may remain in the press while the tools are being sharpened. If it should be decided that the edge 44 in the cutting position has become dull another of the cutting edges may be moved into the cutting position by removing the screw 43, lifting the cutter 41 from the support and turning it until the selected sharp cutting edge is moved into the cutting position. At this time two of the apertures 40 will register with the pins 39 to assure accurate positioning of the cutting edge in the cutting position. The cutter is held against displacement by the screw 43 started in the aperture 37. When the tools 15 are mounted again in the press, after being sharpened their surfaces 20 will be in a new plane. The cutter 41, particularly its face 45 must be lowered into the new plane with the surfaces 20. This is accomplished by loosening the screw 53 sufficiently to free the elements 50 for movement and applying a rocking motion to the spindle 47 through either element 50 to move the elements simultaneously relative to the upper surface of the arm 30 until the face 45 is in the new plane. The elements may be locked in their new positions by tightening the screw 53 and the support 32 and cutter 41 may be secured in their new positions by tightening the screw 43.

The cutter 41 having four cutting edges will serve at least through four series of processing periods with the tools 14 and 15 and after all of the cutting edges 44 of the cutter 41 become dull, they may be sharpened, during which time another like cutter 41 with four sharp edges may be used.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A material cutting unit for a multiple tool press having upper and lower holders with sets of material processing tools mounted at predetermined spaced positions thereon adapted for relative movement during operating cycles of the press to cause the sets of tools to process a strip of material, the tools mounted on the lower holder having their upper surfaces lying in a given plane to support the material jointly, the material cutter comprising a support having an upper surface, a cutter mounted on the surface of the support and having an upper face and a cutting edge, the cutting edge being adapted to cooperate with a cutting member mounted on the upper holder to cut lengths from the material, an arm for the support, means to mount the arm at any selected position on the lower holder relative to the tools thereon, a guide carried by the arm to hold the support for vertical movement thereon, and an element carried by the support and adjustable relative to the arm to locate the face of the cutter in the plane to cooperate in supporting the material.

2. A material cutting unit for a multiple tool press having upper and lower holders with sets of material processing tools mounted at predetermined spaced positions thereon adapted for relative movement during operating cycles of the press to cause the sets of tools to process a strip of material, the tools mounted on the lower holder having their upper surfaces lying in a given plane to support the material jointly, the material cutter comprising a support having an upper surface, a cutter mounted on the surface of the support and having an upper face and a cutting edge, the cutting edge being adapted to cooperate with a cutting member mounted on the upper holder to cut lengths from the material, an arm for the support, means to mount the arm at any selected position on the lower holder relative to the tools thereon, a guide carried by the arm to hold the support for vertical movement thereon, and an element carried by the support and adjustable relative to the arm to locate the face of the cutter in the plane to cooperate in supporting the material, machining of the upper ends of the tools mounted on the lower holder causing their upper surfaces to lay in a new plane, the element being adapted for movement relative to the arm to support the face of the cutter in the new plane.

3. A material cutting unit for a multiple tool press having upper and lower holders with sets of material processing tools mounted at predetermined spaced positions thereon adapted for relative movement during operating cycles of the press to cause the sets of tools to process a strip of material, the tools mounted on the lower holder having their upper surfaces lying in a given plane to support the material jointly, the material cutter comprising a support having an upper surface, a cutter having a plurality of cutting edges disposed about an upper face thereof, means to removably mount the cutter on the upper surface of the support to locate a selected one of the cutting edges in a cutting position to cooperate with a cutting member mounted on the upper holder to cut lengths from the material, an arm for the support means to mount the arm at any selected position on the lower holder relative to the tools thereon, a guide carried by the arm to hold the support for vertical movement, and an element carried by the support and adjustable relative to the arm to locate the face of the cutter in the plane to cooperate in supporting the material.

4. A material cutting unit for a multiple tool press having upper and lower holders with sets of material processing tools mounted at predetermined spaced positions thereon adapted for relative movement during operating cycle of the press to cause the sets of tools to process a strip of material, the tools mounted on the lower holder having their upper surfaces lying in a given plane to support the material jointly, the material cutter comprising a support having an upper surface, a cutter mounted on the surface of the support and having an upper face and a cutting edge, the cutting edge being adapted to cooperate with a cutting member mounted on the upper holder to cut lengths from the material, an arm for the support means to mount the arm at any selected position on the lower holder relative to the tools thereon, the support being formed for interengagement with the arm to limit the support to only vertical movement relative to the arm, and elements carried by the support and adjustable simultaneously relative to the arm to hold the support at any desired position above the arm to locate the face of the cutter in the plane.

5. A cutting unit for material movable in variable planes through a press having a lower tool holder and an upper tool holder for a companion cutting member, the cutting unit comprising an arm having side surfaces adapted to be mounted at any selected position on the lower tool holder, a rod fixedly mounted on the arm and extending vertically therefrom, a support bifurcated at its lower end with legs thereof straddling the arm and slidably engaging the side surfaces, the support having an upper surface and a vertical aperture therein perpendicular to the surface to receive the rod to thereby connect the support to the arm, a cutter mounted on the surface of the support and having an upper face and a cutting edge, the cutting edge being adapted to cooperate with the cutting member to cut lengths from the material, and an element carried by the support and adjustable relative to the arm to vary the vertical position of the support relative to the arm to locate the face of the cutter in the variable planes.

6. A cutting unit for material movable in variable planes through a press having a lower tool holder and an upper tool holder for a companion cutting member, the cutting unit comprising an arm having side surfaces adapted to be mounted at any selected position on the lower tool holder, a rod fixedly mounted on the arm and extending vertically therefrom, a support bifurcated at its lower end with legs thereof straddling the arm and slidably engaging the side surfaces, the support having an upper surface and a vertical aperture therein perpendicular to the surface to receive the rod to thereby connect the support to the arm, a cutter having a plurality of cutting edges disposed about an upper face thereof, means to removably mount the cutter on the upper surface of the support to locate a selected one of the cutting edges in a cutting position to cooperate with a cutting member mounted on the upper holder to cut lengths from the material, and an element carried by the support and adjustable relative to the arm to vary the vertical position of the support relative to the arm to locate the face of the cutter in the variable planes.

7. A cutting unit for material movable in variable planes through a press having a lower tool holder and an upper tool holder for a companion cutting member, the cutting unit comprising an arm having side surfaces adapted to be mounted at any selected position on the lower tool holder, a rod fixedly mounted on the arm and extending vertically therefrom, a support bifurcated at its lower end with legs thereof straddling the arm and slidably engaging the side surfaces, the support having an upper surface and a vertical aperture therein perpendicular to the surface to receive the rod to thereby connect the support to the arm, a cutter mounted on the surface of the support and having an upper face and a cutting edge, the cutting edge being adapted to cooperate with the cutting member to cut lengths from the material, a spindle extending through the support and rockable about an axis parallel with the arm, like elements adapted to hold the support varied distances from the arm disposed upon opposite ends of the spindle and keyed thereto for axial movement thereon, and means, normally locking the spindle against rocking movement, actuable to free the spindle for rotary movement so that the elements may be rotated simultaneously therewith relative to the arm to vary the vertical position of the support to locate the face of the cutter in the variable planes.

References Cited in the file of this patent

UNITED STATES PATENTS

| | | |
|---|---|---|
| 362,566 | Beaudry | May 10, 1887 |
| 700,053 | Kendall | May 13, 1902 |
| 1,370,116 | Johnson | Mar. 1, 1921 |
| 1,402,284 | Daniels | Jan. 3, 1922 |
| 1,866,855 | Kirsten | July 12, 1932 |
| 2,317,424 | Wales | Apr. 27, 1943 |
| 2,504,642 | Burgess | Apr. 18, 1950 |
| 2,689,487 | Krueger | Sept. 21, 1954 |